United States Patent
Cardamore et al.

(10) Patent No.: US 9,497,220 B2
(45) Date of Patent: Nov. 15, 2016

(54) DYNAMICALLY GENERATING PERIMETERS

(75) Inventors: Daniel Cardamore, Kanata (CA); Darrell Reginald May, Waterloo (CA); Sivakumar Nagarajan, Ottawa (CA); Carl Lloyd Cherry, Waterloo (CA)

(73) Assignees: BlackBerry Limited, Waterloo, Ontario; 2236008 Ontario Inc., Waterloo, Ontario (*) Notice: Subject to any disclaimer, the term of this patent is extended or adjusted under 35 U.S.C. 154(b) by 0 days.

(21) Appl. No.: 13/274,913

(22) Filed: Oct. 17, 2011

(65) Prior Publication Data

US 2013/0097657 A1    Apr. 18, 2013

(51) Int. Cl.
G06F 17/00 (2006.01)
H04L 29/06 (2006.01)
G06F 3/12 (2006.01)
H04W 12/08 (2009.01)

(52) U.S. Cl.
CPC ............. *H04L 63/20* (2013.01); *G06F 3/1204* (2013.01); *G06F 3/1286* (2013.01); *H04W 12/08* (2013.01)

(58) Field of Classification Search
CPC .... H04L 63/20; H04W 12/08; G06F 3/1204; G06F 3/1257; G06F 3/127; G06F 3/1286; G06F 3/1296
USPC .......................................................... 726/1
See application file for complete search history.

(56) References Cited

U.S. PATENT DOCUMENTS

| | | | |
|---|---|---|---|
| 4,815,128 A | 3/1989 | Malek | |
| 4,837,812 A | 6/1989 | Takahashi et al. | |
| 4,945,556 A | 7/1990 | Namekawa | |
| 4,972,457 A | 11/1990 | O'Sullivan | |
| 4,991,197 A | 2/1991 | Morris | |
| 5,220,604 A | 6/1993 | Gasser et al. | |
| 5,408,520 A | 4/1995 | Clark et al. | |
| 5,606,594 A | 2/1997 | Register et al. | |

(Continued)

FOREIGN PATENT DOCUMENTS

| CA | 2505343 | 6/2010 |
|---|---|---|
| CN | 101004776 | 7/2007 |

(Continued)

OTHER PUBLICATIONS

Research in Motion, "BlackBerry Bridge App 2.1 and Blackberry PlayBook Tablet 2.1, Security Technical Overview"; Version: 2.1; Jul. 17, 2012; 43 pages.

(Continued)

*Primary Examiner* — Ashok Patel
*Assistant Examiner* — Gary Gracia
(74) *Attorney, Agent, or Firm* — Fish & Richardson P.C.

(57) ABSTRACT

Systems and techniques relating to securely managing electronic resources are described. A described technique includes receiving a request to add to a mobile device an account setting for a server resource account. Detecting a trigger event for a new perimeter based on the account setting. In response to a parameter or a pattern associated with the account setting, retrieving a security policy from a resource server for the server resource account, and generating, by the mobile device, a new perimeter including the server resource account based on the security policy. The new perimeter is configured to prevent transferring data associated with the server resource account being transferred to mobile-device resources external to the new perimeter.

25 Claims, 6 Drawing Sheets

(56) References Cited

U.S. PATENT DOCUMENTS

| | | |
|---|---|---|
| 5,774,551 A | 6/1998 | Wu et al. |
| 5,802,483 A | 9/1998 | Morris |
| 5,826,265 A | 10/1998 | Van Huben et al. |
| 5,850,515 A | 12/1998 | Lo et al. |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,088,693 A | 7/2000 | Van Huben et al. |
| 6,105,132 A | 8/2000 | Fritch et al. |
| 6,131,136 A | 10/2000 | Liebenow et al. |
| 6,219,694 B1 | 4/2001 | Lazaridis et al. |
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,292,798 B1 | 9/2001 | Dockter et al. |
| 6,343,313 B1 | 1/2002 | Salesky et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,408,336 B1 | 6/2002 | Schneider et al. |
| 6,412,070 B1 | 6/2002 | Van Dyke et al. |
| 6,490,289 B1 | 12/2002 | Zhang et al. |
| 6,516,421 B1 | 2/2003 | Peters |
| 6,546,554 B1 | 4/2003 | Schmidt et al. |
| 6,629,246 B1 | 9/2003 | Gadi |
| 6,647,388 B2 | 11/2003 | Numao et al. |
| 6,668,323 B1 | 12/2003 | Challener et al. |
| 6,745,047 B1 | 6/2004 | Karstens et al. |
| 6,748,543 B1 | 6/2004 | Vilhuber |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,795,688 B1 | 9/2004 | Plasson et al. |
| 6,795,967 B1 | 9/2004 | Evans et al. |
| 6,799,208 B1 | 9/2004 | Sankaranarayan |
| 6,832,256 B1 | 12/2004 | Toga |
| 6,886,038 B1 | 4/2005 | Tabbara et al. |
| 6,895,502 B1 | 5/2005 | Fraser et al. |
| 6,901,429 B2 | 5/2005 | Dowling |
| 6,957,330 B1 | 10/2005 | Hughes |
| 6,976,241 B2 | 12/2005 | Cruz et al. |
| 6,978,385 B1 | 12/2005 | Cheston et al. |
| 6,999,562 B2 | 2/2006 | Winick |
| 7,042,988 B2 | 5/2006 | Juitt et al. |
| 7,076,239 B2 | 7/2006 | Kirkup et al. |
| 7,076,797 B2 | 7/2006 | Loveland |
| 7,146,638 B2 | 12/2006 | Malcolm |
| 7,185,192 B1 | 2/2007 | Kahn |
| 7,187,678 B2 | 3/2007 | Cunetto et al. |
| 7,246,374 B1 | 7/2007 | Simon et al. |
| 7,315,750 B2 | 1/2008 | Chou et al. |
| 7,330,712 B2 | 2/2008 | Kirkup et al. |
| 7,331,058 B1 | 2/2008 | Gladney |
| 7,400,878 B2 | 7/2008 | Hassan et al. |
| 7,469,417 B2 | 12/2008 | Fearnley et al. |
| 7,496,954 B1 | 2/2009 | Himawan |
| 7,526,800 B2 * | 4/2009 | Wright et al. .................. 726/11 |
| 7,574,200 B2 | 8/2009 | Hassan et al. |
| 7,603,466 B2 | 10/2009 | Kilian-Kehr et al. |
| 7,689,653 B2 | 3/2010 | Cohen |
| 7,721,087 B1 | 5/2010 | DiPasquo et al. |
| 7,734,284 B2 | 6/2010 | Adams et al. |
| 7,751,331 B1 | 7/2010 | Blair et al. |
| 7,765,185 B2 | 7/2010 | Rangadass |
| 7,793,355 B2 | 9/2010 | Little et al. |
| 7,869,789 B2 | 1/2011 | Hassan et al. |
| 7,886,053 B1 | 2/2011 | Newstadt et al. |
| 7,890,627 B1 | 2/2011 | Thomas |
| 7,917,963 B2 | 3/2011 | Goyal et al. |
| 7,921,452 B2 | 4/2011 | Ridlon et al. |
| 8,005,469 B2 | 8/2011 | Adams et al. |
| 8,074,078 B2 | 12/2011 | Brown et al. |
| 8,208,900 B2 * | 6/2012 | Adler et al. .................. 455/411 |
| 8,344,135 B2 | 1/2013 | Hirose |
| 8,495,700 B2 | 7/2013 | Shahbazi |
| 8,495,731 B1 * | 7/2013 | Mar .................. G06F 21/74 379/161 |
| 8,503,340 B1 | 8/2013 | Xu |
| 8,588,749 B1 * | 11/2013 | Sadhvani .................. H04M 1/24 379/1.01 |
| 8,656,016 B1 | 2/2014 | Bender et al. |
| 8,799,227 B2 | 8/2014 | Ferguson |
| 8,869,235 B2 | 10/2014 | Qureshi |
| 8,909,915 B2 | 12/2014 | Ferren |
| 8,931,042 B1 | 1/2015 | Weiss |
| 2001/0047485 A1 | 11/2001 | Brown et al. |
| 2001/0056549 A1 | 12/2001 | Pinault et al. |
| 2002/0013815 A1 | 1/2002 | Obradovich et al. |
| 2002/0019944 A1 | 2/2002 | Kou |
| 2002/0029280 A1 | 3/2002 | Holden et al. |
| 2002/0031230 A1 | 3/2002 | Sweet et al. |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0095571 A1 | 7/2002 | Bradee |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1 | 3/2003 | Srimuang |
| 2003/0065676 A1 | 4/2003 | Gbadegesin et al. |
| 2003/0070091 A1 | 4/2003 | Loveland |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheelere et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0226015 A1 | 12/2003 | Neufled et al. |
| 2003/0236983 A1 | 12/2003 | Mihm, Jr. et al. |
| 2004/0001101 A1 | 1/2004 | Trajkovic et al. |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0205342 A1 | 10/2004 | Roegner |
| 2004/0209608 A1 | 10/2004 | Kouznetsov et al. |
| 2004/0215702 A1 * | 10/2004 | Hamasaki et al. ............ 709/201 |
| 2004/0268151 A1 | 12/2004 | Matsuda et al. |
| 2005/0022023 A1 | 1/2005 | Chincheck et al. |
| 2005/0154935 A1 | 7/2005 | Jin |
| 2005/0164687 A1 | 7/2005 | DiFazio |
| 2005/0192008 A1 | 9/2005 | Desai et al. |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0015621 A1 | 1/2006 | Quinn |
| 2006/0059556 A1 | 3/2006 | Royer |
| 2006/0070114 A1 | 3/2006 | Wood et al. |
| 2006/0090136 A1 | 4/2006 | Miller et al. |
| 2006/0120526 A1 | 6/2006 | Boucher et al. |
| 2006/0123485 A1 | 6/2006 | Williams |
| 2006/0129848 A1 | 6/2006 | Paksoy et al. |
| 2006/0129948 A1 | 6/2006 | Hamzy et al. |
| 2006/0149846 A1 | 7/2006 | Schuba |
| 2006/0156026 A1 | 7/2006 | Utin |
| 2006/0168259 A1 * | 7/2006 | Spilotro et al. ............... 709/229 |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2006/0242685 A1 * | 10/2006 | Heard et al. ..................... 726/3 |
| 2006/0274750 A1 | 12/2006 | Babbar et al. |
| 2007/0019643 A1 | 1/2007 | Shaheen |
| 2007/0050854 A1 | 3/2007 | Cooperstein et al. |
| 2007/0073694 A1 | 3/2007 | Picault et al. |

(56) References Cited

U.S. PATENT DOCUMENTS

| | | | |
|---|---|---|---|
| 2007/0150730 A1* | 6/2007 | Conti | G06F 21/52 713/166 |
| 2007/0156766 A1 | 7/2007 | Hoang et al. | |
| 2007/0204153 A1 | 8/2007 | Tome et al. | |
| 2007/0204166 A1 | 8/2007 | Tome et al. | |
| 2007/0254631 A1* | 11/2007 | Spooner | 455/411 |
| 2007/0277127 A1 | 11/2007 | Carlson et al. | |
| 2008/0002726 A1 | 1/2008 | Haung et al. | |
| 2008/0028442 A1 | 1/2008 | Kaza et al. | |
| 2008/0081609 A1* | 4/2008 | Burgan et al. | 455/425 |
| 2008/0098237 A1 | 4/2008 | Dung et al. | |
| 2008/0125146 A1 | 5/2008 | Bainbridge | |
| 2008/0130524 A1 | 6/2008 | Volach et al. | |
| 2008/0132202 A1 | 6/2008 | Kirkup et al. | |
| 2008/0134347 A1 | 6/2008 | Goyal et al. | |
| 2008/0137593 A1 | 6/2008 | Laudermilch et al. | |
| 2008/0141136 A1 | 6/2008 | Ozzie | |
| 2008/0184336 A1 | 7/2008 | Sarukkai et al. | |
| 2008/0222694 A1 | 9/2008 | Nakae | |
| 2008/0222711 A1 | 9/2008 | Michaelis | |
| 2008/0235041 A1 | 9/2008 | Cashdollar et al. | |
| 2008/0313648 A1 | 12/2008 | Wang | |
| 2008/0318616 A1 | 12/2008 | Chipalkatti et al. | |
| 2009/0068996 A1 | 3/2009 | Bakker et al. | |
| 2009/0070181 A1 | 3/2009 | Loeffen | |
| 2009/0094668 A1 | 4/2009 | Corbin et al. | |
| 2009/0178107 A1 | 7/2009 | Karjoth et al. | |
| 2009/0181662 A1* | 7/2009 | Fleischman et al. | 455/419 |
| 2009/0254753 A1 | 10/2009 | De Atley et al. | |
| 2009/0260052 A1 | 10/2009 | Bathula et al. | |
| 2009/0300707 A1 | 12/2009 | Garimella et al. | |
| 2010/0024016 A1 | 1/2010 | Violleau et al. | |
| 2010/0024020 A1* | 1/2010 | Baugher et al. | 726/7 |
| 2010/0081417 A1* | 4/2010 | Hickie | 455/414.1 |
| 2010/0088753 A1 | 4/2010 | Ayres et al. | |
| 2010/0100825 A1* | 4/2010 | Sharoni | 715/740 |
| 2010/0107215 A1 | 4/2010 | Bechtel et al. | |
| 2010/0153969 A1 | 6/2010 | Dyba et al. | |
| 2010/0184440 A1 | 7/2010 | Mao et al. | |
| 2010/0222097 A1 | 9/2010 | Gisby et al. | |
| 2010/0242086 A1 | 9/2010 | Adams et al. | |
| 2010/0274910 A1 | 10/2010 | Ghanaie-Sichanie et al. | |
| 2010/0278162 A1 | 11/2010 | Groux et al. | |
| 2010/0281487 A1 | 11/2010 | Schneider et al. | |
| 2010/0299152 A1 | 11/2010 | Batchu | |
| 2010/0299376 A1 | 11/2010 | Batchu et al. | |
| 2010/0299394 A1 | 11/2010 | Jania et al. | |
| 2010/0299719 A1* | 11/2010 | Burks et al. | 726/3 |
| 2010/0319053 A1 | 12/2010 | Gharabally | |
| 2010/0325221 A1 | 12/2010 | Cohen et al. | |
| 2010/0325430 A1 | 12/2010 | Denninghoff | |
| 2011/0010699 A1 | 1/2011 | Cooper et al. | |
| 2011/0030045 A1 | 2/2011 | Beauregard | |
| 2011/0082808 A1 | 4/2011 | Beykpour et al. | |
| 2011/0099605 A1 | 4/2011 | Cha et al. | |
| 2011/0126214 A1 | 5/2011 | O'Farrell et al. | |
| 2011/0145833 A1* | 6/2011 | De Los Reyes et al. | 718/106 |
| 2011/0179083 A1 | 7/2011 | Galloway et al. | |
| 2011/0195698 A1 | 8/2011 | Pearce | |
| 2011/0210171 A1* | 9/2011 | Brown et al. | 235/382 |
| 2011/0246753 A1* | 10/2011 | Thomas | 713/1 |
| 2011/0252234 A1* | 10/2011 | De Atley | H04L 9/0891 713/165 |
| 2011/0252240 A1 | 10/2011 | Freedman et al. | 713/169 |
| 2011/0307946 A1 | 12/2011 | Hilerio | |
| 2011/0314467 A1 | 12/2011 | Pearson | |
| 2012/0005477 A1 | 1/2012 | Wei et al. | |
| 2012/0005723 A1* | 1/2012 | Chaturvedi et al. | 726/1 |
| 2012/0005745 A1 | 1/2012 | Wei et al. | |
| 2012/0023573 A1 | 1/2012 | Shi | |
| 2012/0054853 A1* | 3/2012 | Gupta et al. | 726/17 |
| 2012/0066691 A1 | 3/2012 | Branton | |
| 2012/0079110 A1* | 3/2012 | Brown et al. | 709/225 |
| 2012/0079586 A1* | 3/2012 | Brown | G06F 21/31 726/16 |
| 2012/0079609 A1* | 3/2012 | Bender | G06F 21/629 726/30 |
| 2012/0084184 A1* | 4/2012 | Raleigh et al. | 705/30 |
| 2012/0109826 A1* | 5/2012 | Kobres | 705/64 |
| 2012/0131685 A1* | 5/2012 | Broch et al. | 726/30 |
| 2012/0144196 A1 | 6/2012 | Owen et al. | |
| 2012/0157165 A1* | 6/2012 | Kim et al. | 455/566 |
| 2012/0157166 A1* | 6/2012 | Kim et al. | 455/566 |
| 2012/0202527 A1 | 8/2012 | Obradovich et al. | |
| 2012/0210443 A1* | 8/2012 | Blaisdell et al. | 726/27 |
| 2012/0214442 A1* | 8/2012 | Crawford et al. | 455/411 |
| 2012/0214503 A1* | 8/2012 | Liu et al. | 455/456.1 |
| 2012/0278863 A1 | 11/2012 | Wallace et al. | |
| 2012/0278904 A1 | 11/2012 | Perez et al. | |
| 2012/0291140 A1 | 11/2012 | Robert et al. | |
| 2012/0304280 A1* | 11/2012 | Hayashida | 726/16 |
| 2012/0309344 A1 | 12/2012 | Ferrazzini et al. | |
| 2013/0074142 A1* | 3/2013 | Brennan et al. | 726/1 |
| 2013/0097316 A1 | 4/2013 | Bender et al. | |
| 2013/0097657 A1 | 4/2013 | Cardamore et al. | |
| 2013/0124583 A1 | 5/2013 | Ferguson et al. | |
| 2013/0174222 A1 | 7/2013 | Ogle | |
| 2013/0219465 A1* | 8/2013 | Tse et al. | 726/3 |
| 2013/0346606 A1 | 12/2013 | Ryerson et al. | |
| 2014/0330990 A1 | 11/2014 | Lang | |

FOREIGN PATENT DOCUMENTS

| | | |
|---|---|---|
| CN | 101253487 | 8/2008 |
| CN | 101523878 | 9/2009 |
| EP | 332558 | 9/1989 |
| EP | 605106 | 7/1994 |
| EP | 973350 | 1/2000 |
| EP | 1168141 | 1/2002 |
| EP | 1471691 | 10/2004 |
| EP | 1596410 | 11/2005 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000-253241 | 9/2000 |
| JP | 2001-077811 | 3/2001 |
| JP | 2001-203761 | 7/2001 |
| JP | 2002-288087 | 10/2002 |
| WO | 96/25828 | 8/1996 |
| WO | 99/05814 | 2/1999 |
| WO | 00/59225 | 10/2000 |
| WO | 00/60434 | 10/2000 |
| WO | 2004017592 | 2/2004 |
| WO | 2004043031 | 5/2004 |
| WO | 2005045550 | 5/2005 |
| WO | WO2005062279 | 7/2005 |
| WO | 2006/130807 | 12/2006 |
| WO | 2007048251 | 5/2007 |
| WO | 2009/012329 | 1/2009 |
| WO | 2009014975 | 1/2009 |
| WO | 2012109497 | 1/2009 |
| WO | 2009021200 | 2/2009 |
| WO | 2012037656 | 3/2012 |
| WO | 2012037657 | 3/2012 |
| WO | 2012037658 | 3/2012 |

OTHER PUBLICATIONS

Research in Motion, "BlackBerry Device Service 6.1 and BlackBerry PlayBook Tablet 2.1, Security Technical Overview"; Version: 6.1; Sep. 17, 2012; 90 pages.

Office Action issued in U.S. Appl. No. 10/524,353 on Sep. 21, 2012; 16 pages.

Office Action issued in U.S. Appl. No. 13/098,456 on Sep. 13, 2012; 20 pages.

International Search Report and Written Opinion issued in International Application No. PCT/CA2011/001058 on Dec. 21, 2011; 9 pages.

(56) References Cited

OTHER PUBLICATIONS

XP002167366, Chen, Zhigun; "Java Card Technology for Smart Cards: Architecture and Programmer's Guide"; "Applet Firewall and Object Sharing," Internet citation; Jun. 2, 2000; <http://developer.java.sun.com/developer/Books/consumerproducts/javacard/ch09.pdf>.
Ferguson et al., U.S. Appl. No. 13/293,743, "Managing Cross Perimeter Access," filed Nov. 10, 2011.
Office Action issued in U.S. Appl. No. 13/398,676 on Sep. 5, 2012; 21 pages.
Extended European Search Report issued in European Application No. 11186796.6 on Jan. 18, 2012; 8 pages.
Extended European Search Report issued in European Application No. 11188696.6 on Apr. 12, 2012; 7 pages.
Extended European Search Report issued in European Application No. 11186802.2 on Jan. 18, 2012; 7 pages.
Microsoft Office: Microsoft Outlook 2010 Product Guide; Microsoft Corp. published in 2010; 65 pages.
Windows 7 Product Guide; Microsoft Corp. published in 2009; 140 pages.
Extended European Search Report issued in European Application No. 12173030.3 on Nov. 22, 2012; 6 pages.
Office Action issued in U.S. Appl. No. 13/25,097 on Feb. 28, 2013; 18 pages.
Extended European Search Report issued in European Application No. 12189773.0 on Mar. 7, 2013; 8 pages.
International Search Report and Written Opinion of the International Searching Authority issued in International Application No. PCT/CA2012/050796 on Feb. 21, 2013; 13 pages.
Google Inc.; Android 2.3.4 User's Guide; May 20, 2011; 384 pages.
Microsoft Corp.; Microsoft Outlook 2010; Released Jul. 15, 2010; 27 pages.
Office Action issued in U.S. Appl. No. 13/293,743 on Feb. 14, 2013; 15 pages.
International Search Report and Written Opinion issued in International Application No. PCT/CA2012/050797 on Feb. 5, 2013; 8 pages.
View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.
Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5&or . . ., pp. 1-6, retrieved on Feb. 12, 2010.
EP Application No. 12155659.1, Extended European Search Report dated Jan. 8, 2012.
Smartphone Security Beyond Lock and Wipe (Jun. 10, 2010): http://www.enterprisemobiletoday.com/article. php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Extended European Search Report mailed Jul. 13, 2012, in corresponding European patent application No. 12153439.0.
"Customizing User Interaction in Smart Phones", Pervasive Computing, IEEE CS (2006) pp. 81-90 (URL: http://www.idi. ntnu.no/grupperlsu/bibliography/pdf/2006/Korpipaa2006pc.pdf).
"Supporting Mobile Privacy and Security through Sensor-Based Context Detection"', Julian Seifert, Second International Workshop on Security and Privacy in Spontaneous Interaction and Mobile Phone Use, May 17, 2010, Finland (U RL: http://www.medien.ifi.lmu.de/iwssi201 0/papers/iwssi-spmu201 O-seifert.pdf)".
EagleVision: A Pervasive Mobile Device Protection System, Ka Yang, Nalin Subramanian, Daji Qiao, and Wen sheng Zhang, Iowa State Unviersity (URL: http://www.cs.iastate.edu/-wzhang/papers/eagleVision.pdf).
"Using context-profiling to aid access control decisions in mobile devices"', Gupta et al., Nokia Research Center (URL: http://www.cerias.purdue.edu/assets/symposium/2011-posters1372-C48.pdf) Please refer to the I-page file named 372-C48.pdf".
Owen, Russell N., U.S. Appl. No. 10/524,353, filed Feb 14, 2005; Title: System and Method for Secure Control of Resources of Wireless Mobile Communication Device.
International Application No. PCT/CA 03101245, International Search Report dated Dec. 23, 2003.
International Application No. PCT/CA 03101245, PCT Written Opinion, dated Apr. 23, 2004.
International Application No. PCT/CA 03101245, PCT Written Opinion, dated Sep. 20, 2004.
International Application No. PCT/CA 03101245, PCT International Preliminary Examination Report, dated Nov. 29, 2004.
Owen, Russell N., U.S. Appl. No. 13/371,093, filed Feb. 10, 2012; Title: System and Method for Secure Control of Resources of Wireless Mobile Communication Devices Secure Control of Resources of Wireless Mobile Communication Device.
Int'l Search Report and the Written Opinion of the Int'l Searching Authority, or the Declaration of Appln. Serial No. PCT/CA2004/000250 of 02120/2004—12 pgs.
Int'l Search Report or the Declaration of Appln. Serial No. PCT/CA03/01679 of 10131/2003—6 pgs.
Red Hat: "Red Hat Linux 7.2—The Official Red Had Linux Reference Guide" Red Hat Linux Manuals, Online!, Oct. 22, 2001, XP002276029, pp. 145-155.
Sygate: "Sygate Personal Firewall Pro User Guide" Sygate Personal Firewall Pro User Guide version 2.02001, pp. 1-77, XP002248366.
Bender, Christopher Lyle; U.S. Appl. No. 13/074,136, filed Mar. 29, 2011; Title: Data Source Based Application Sandboxing.
"A Technical Overview of the Lucent VPN Firewall" White Paper Lucent Technologies, XX, XX, Aug. 2002, pp. 1-35, XP002271173, Chapter 1.
European Search Report of Appln. No. 04256690.1-2412, date of mailing Apr. 6, 2005—9 pgs.
Fourth Office Action. Chinese Application No. 200380105435.2. Dated: Aug. 3, 2011.
Patent Certificate. Indian Patent Application No. 1956/DELNP/2005. Dated: Oct. 31, 2003.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Notice of Allowance. Canadian Application No. 2,505,343. Dated: Sep. 15, 2009.
Extended European Search Report issued in European Application No. 12189805.0 on Apr. 16, 2013; 6 pages.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.

(56) References Cited

OTHER PUBLICATIONS

Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
Office Action issued in Canadian Application No. 2,564,914 on May 3, 2010; 4 pages.
Office Action issued in Canadian Application No. 2,564,914 on Apr. 4, 2011; 2 pages.
First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.
Communication Pursuant to Article 94(3) EPC issued in European Application No. 05738877.9 on Jul. 15, 2009; 4 pages.
Communication under Rule 71(3) EPC issued in European Application No. 05738877.9 on Sep. 17, 2010; 41 pages.
First Examination Report issued in Indian Application No. 6068/DELNP/2006 on Jun. 3, 2010; 2 pages.
Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
Office Action issued in U.S. Appl. No. 13/659,527 on May 23, 2013; 8 pages.
Office Action issued in U.S. Appl. No. 13/722,213 on May 22, 2013; 8 pages.
Office Action issued in Canadian Application No. 2,769,646 on Jun. 5, 2012; 3 pages.
Office Action issued in Canadian Application No. 2,769,646 on Oct. 22, 2012; 2 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
Office Action issued in U.S. Appl. No. 13/293,743 on Sep. 20, 2013; 19 pages.
Office Action issued in U.S. Appl. No. 13/274,913 on Jul. 16, 2013.
Office Action issued in U.S. Appl. No. 13/25,097 on Sep. 10, 2013; 21 pages.
Office Action issued in U.S. Appl. No. 13/098,456 on Apr. 17, 2013; 31 pages.
Office Action issued in U.S. Appl. No. 13/098,456 on Sep. 27, 2013; 28 pages.
Communication Pursuant to Article 94(3) EPC issued in European Application No. 11188696.6 on Jul. 9, 2013; 4 pages.
Office Action issued in U.S. Appl. No. 10/524,353 on Sep. 21, 2012.
Owen, Russell N., U.S. Appl. No. 10/524,353, filed Aug. 19, 2003; Title: System and Method for Secure Control of Resources of Wireless Mobile Communication Devices.
Notice of Allowance issued in U.S. Appl. No. 13/398,676 on Sep. 5, 2012; 22 pages.
Notice of Allowance issued in U.S. Appl. No. 13/659,527 on Oct. 7, 2013; 15 pages.
Notice of Allowance issued in U.S. Appl. No. 13/490,956 on Dec. 4, 2013; 8 pages.
Office Action issued in U.S. Appl. No. 13/296,963 on Nov. 18, 2013; 23 pages.
Office Action issued in Canadian Application No. 2,564,914 on Dec. 3, 2013; 2 pages.
Office Action issued in Chinese Application No. 201110308441.4 on Oct. 25, 2013; 9 pages.
International Preliminary Report on Patentability under Chapter II issued in International Application No. PCT/CA2012/050797 on Feb. 12, 2014; 13 pages.
IETF RFC 3530; "Network File System (NFS) Version 4 Protocol"; Apr. 2003.
"Secure Inter-Process Communication"; Apr. 4, 2004. Retrieved from internet on Jan. 20, 2014 https://web.archive.org/web/20040404015137/http://cr.yp.to/docs/secureipc.html.
Notice of Allowance issued in Canadian Application No. 2,769,646 on Feb. 15, 2013; 1 page.
Examiner's First Report issued in Australian Application No. 2012203391 on Jan. 22, 2014; 4 pages.
Advisory Action issued in U.S. Appl. No. 13/293,743 on Nov. 26, 2013; 3 pages.
Advisory Action issued in U.S. Appl. No. 13/275,097 on Dec. 6, 2013; 4 pages.
Office Action issued in U.S. Appl. No. 13/722,213 on Dec. 4, 2013; 6 pages.
Notice of Allowance issued in U.S. Appl. No. 13/722,213 on Jan. 29, 2014; 7 pages.
Office Action issued in U.S. Appl. No. 13/529,509 on Mar. 25, 2014.
International Preliminary Report on Patentability under Ch. II issued in International Application No. PCT/CA2012/050796 on Mar. 10, 2014; 18 pages.
Communication Pursuant to Article 94(3) EPC issued in European Application No. 11186796.6 on Aug. 29, 2014; 5 pages.
Office Action issued in Canadian Application No. 2,792,772 on Sep. 5, 2014; 3 pages.
Office Action issued in Canadian Application No. 2,792,707 on Sep. 8, 2014; 3 pages.
Office Action issued in U.S. Appl. No. 13/296,963 on Oct. 3, 2014.
Notice of Acceptance issued in Australian Application No. 2012203391 on Jul. 25, 2014; 2 pages.
Communication pursuant to Article 94(3) issued in EP Application No. 11186802.2 on Aug. 25, 2014.
United States Office Action in U.S. Appl. No. 13/25,097, dated Feb. 24, 2015, 22 pages.
United States Office Action in U.S. Appl. No. 13/801,437, dated Mar. 2, 2015, 53 pages.
United States Office Action in U.S. Appl. No. 14/163,416, dated Feb. 17, 2015, 12 pages.
European Communication Pursuant to Article 94(3) EPC in European Application No. 12189773.0, dated Feb. 5, 2015, 6 pages.
Chinese Office Action in Chinese Application No. 201110308441.4, dated Jan. 20, 2015, 5 pages.
Office Action issued in Canadian Application No. 2,820,687 on Nov. 3, 2014; 3 pages.
Office Action issued in U.S. Appl. No. 13/659,561 on Dec. 10, 2014.

(56) References Cited

OTHER PUBLICATIONS

Saha Saurabh, "Auto-Open Certain Websites in Google Chrome Incognito Private Mode", Dec. 31, 2012, <http://web.archive.org/web/20121231021254/http://www.techgyd.com/auto-open-sites-in-google-incognito/360>, 5 pages.

Extended European Search Report issued in European Application No. 13165229.9 on Nov. 10, 2015.

Boyce, "Microsoft Outlook 2010 Inside Out," XP055196121, Microsoft Press, Aug. 15, 2010, 152 pages.

Extended European Search Report in European Application No. 12847536.5, dated Jun. 29, 2015, 8 pages.

Communication Pursuant to Article 94(3) EPC issued in related European Application No. 11186802.2 on Mar. 14, 2016.

Communication Pursuant to Article 94(3) EPC issued in related European Application No. 12847536.5 on Mar. 16, 2016.

United States Office Action in U.S. Appl. No. 13/293,743, dated Apr. 8, 2015, 15 pages.

United States Office Action in U.S. Appl. No. 13/529,509, dated Apr. 8, 2015, 13 pages.

Office Action issued in Chinese Application No. 201180065344.5 on Jun. 3, 2016.

\* cited by examiner

DYNAMICALLY GENERATING PERIMETERS

TECHNICAL FIELD

This disclosure relates to securely managing electronic resources.

BACKGROUND

In many instances, computational devices may include data, applications, and/or network resources whose accessibility are controlled by security protocols. For examples, the security protocols may include user accounts, administration rights, password protection, database management, and others. Though, resources associated with different enterprises and users may require different secured accessibility.

DESCRIPTION OF DRAWINGS

Like reference symbols in the various drawings indicate like elements.

DETAILED DESCRIPTION

Figure 1:
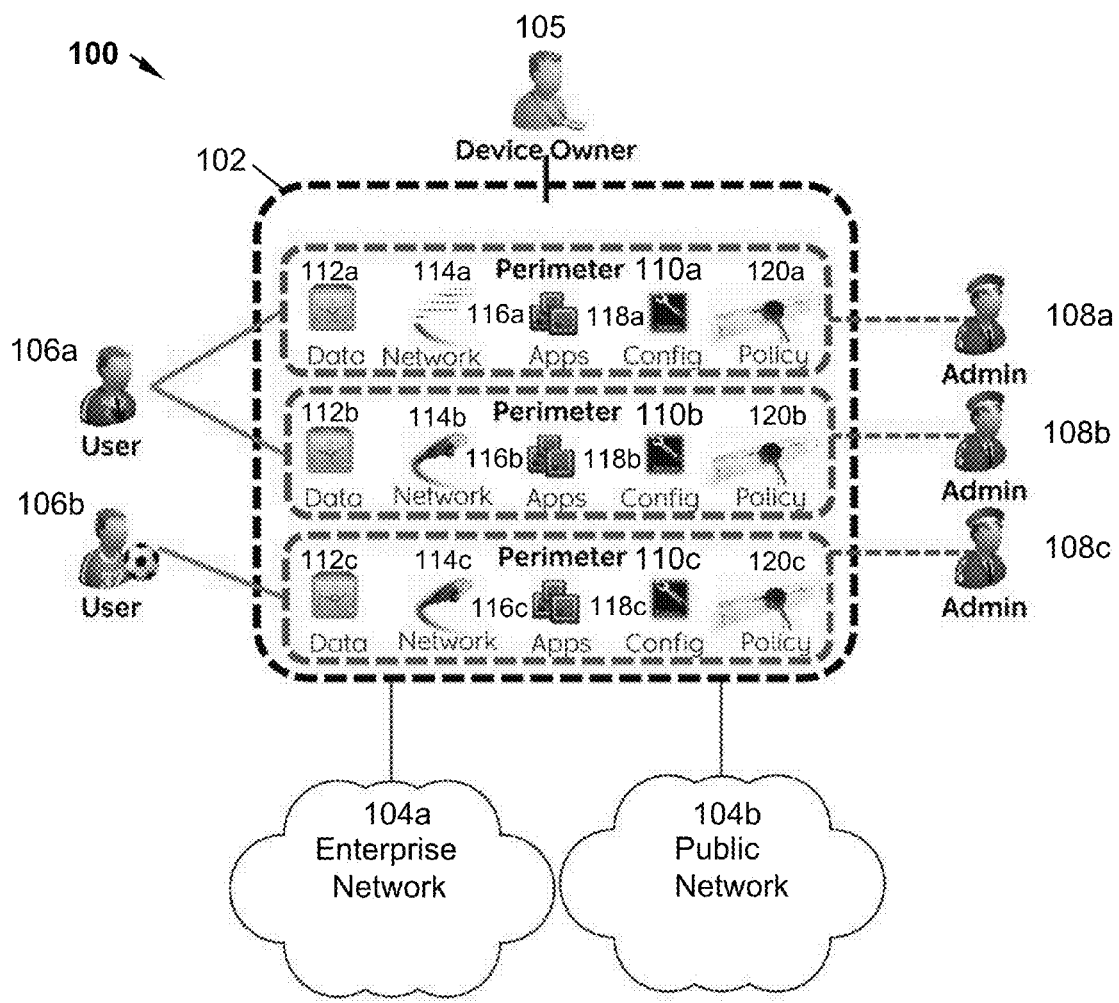
FIG. 1 is an example communication system environment for generating perimeters.

This disclosure provides details and examples of securely managing electronic resources, including techniques for dynamically generating perimeters. A perimeter may generally refer to a logical separation of resources, such as applications, stored data and/or network access. Resources included in a perimeter may be encrypted and password protected to securely separate those resources from resources in different perimeters. For example, resources in different perimeters may not be allowed to transfer between each other. In some implementations, perimeters may include personal perimeters and enterprise perimeters (or corporate perimeters). A personal perimeter may generally refer to a perimeter created by default for a user and managed by the same or a different user through a wireless communication device. An enterprise perimeter may generally refer to a perimeter created for or by a user and managed by a remote management server (e.g., a BlackBerry Enterprise Server (BES)). The personal perimeter may provide permission to be accessed by personal applications, and the enterprise perimeter, when unlocked by the user, may provide permission to be accessed by enterprise applications.

A wireless communication device, such as a tablet computer (e.g., BlackBerry Playbook tablet PC), may be associated with a default perimeter (e.g., a personal perimeter). The default perimeter may include data, application, network access, or other resources that can be used by the wireless communication device for "out of the box" operations. In some implementations, a user of the wireless communication device may add an enterprise account (e.g., a server resource account) to the wireless communication device. The enterprise account may be, for example, an ActiveSync email account, calendar account, or contacts account. The wireless communication device may detect a setting or policy (e.g., a device password protection policy) when the account is set up on the wireless communication device. The setting or policy may be detected by the wireless communication device as a pattern or a parameter. In some implementations, the wireless communication device may dynamically generate a new perimeter based on an event. For example, when a setting or policy is detected, the wireless communication device may automatically generate a new enterprise perimeter to securely separate resources associated with the enterprise account and provide access privileges of the enterprise account to the wireless communication device. In some other implementations, when the setting or policy is detected, a graphic user interface prompt may show on the wireless communication device. The wireless communication device may generate the new enterprise perimeter in accordance with user input through the interface. The new enterprise perimeter may be a private "enterprise" perimeter that can allow the user to download and locally access resources included in the enterprise perimeter on the wireless communication device.

In some aspects, the wireless communication device may access an enterprise server based on using tethering techniques such as a bridge device. Tethering can happen, for example, when the bridge device is a cellular phone (e.g., BlackBerry smartphone), which has both cellular services and wireless local area network (WLAN) services (e.g., Wi-Fi services) enabled, while the wireless communication device can use the WLAN services but not the cellular services. The cellular phone may access, through a cellular network, an enterprise account associated with an enterprise perimeter on an enterprise server. The cellular phone may perform tethering to the wireless communication device through the WLAN. When tethering, a user can add an enterprise account on the wireless communication device through the cellular phone. The wireless communication device may detect a setting or policy stored on the cellular phone associated with the enterprise perimeter, when enterprise account is added on the wireless communication device. The wireless communication device may retrieve settings or policies associated with the enterprise perimeter from the cellular phone. A new, "private", enterprise perimeter may then be automatically generated on the wireless communication device based on the retrieved settings or policies.

FIG. 1 is an example communication system 100 for dynamically generating enterprise perimeters in accordance with the present disclosure. For example, the system 100 may automatically generate a perimeter in response to at least a request to access an enterprise account. Prior to generating a perimeter, the system 100 may receive account settings from a user and identify a pattern in the accounts setting. The pattern may include a parameter, an email address, a network address, security policies, information associated with setting up a push account, information associated with connecting with a bridge, a combination of the foregoing, or others. In some implementations, the system 100 may execute one or more of the following: receive a request to add resources for accessing an enterprise account (e.g., data, access privileges) by a user device (e.g., tablet computer); request account settings and other information (e.g., login information) from the user; determine that requested resources are for accessing an enterprise account with security policies (e.g., password, access rules, encryption keys); present a request to the user to generate a perimeter including the requested resource; transmit a request to an enterprise server for associated security policies; automatically generate a perimeter including the requested resource and security policies; or others. By dynamically generating perimeters, the system 100 may generate a perimeter to protect one set of account resources independent of or without the user or a company system administrator from having extra steps to set policies or configuration of the perimeter.

As for a high-level description of system elements, the communication system 100 includes a wireless communication device 102 communicably coupled to networks 104a and 104b (individually and collectively referred to as 104). In addition, the wireless communication device 102 may interact with a device owner 110, one or more users 106a and 106b (individually and collectively referred to as 106), one or more administrators 108a-c (individually and collectively referred to as 108), a combination of the foregoing, or others. The wireless communication device 102 includes perimeters 110a-c, and each perimeter 110 includes data 112, network access resource 114 for providing access to networks, applications 116 for providing services to users 106, configuration files 118 for configuring resources, and a policy 120 for defining policies for accessing enterprise accounts. As for a high-level description of operation, the device 102 receives a request to add resources for accessing an enterprise account in the enterprise network 104a. In response to the request, the device 102 requests account settings and other information for accessing the enterprise account. The device 102 detects that the enterprise account includes one or more security policies based on a pattern included in the account settings such as an email address. The device 102 retrieves the one or more security policies from a server in the enterprise network 104a and automatically generates a perimeter 110 to include applications 116 and one or more security policies 120 for accessing the enterprise account.

Turning to a more detailed description of the elements of the communication system 100, the wireless communication device 102 may be any local or remote computing device operable to receive requests from the user via a user interface, such as a Graphical User Interface (GUI), a CLI (Command Line Interface), or any of numerous other user interfaces. Thus, where reference is made to a particular interface, it should be understood that any other user interface may be substituted in its place. In various implementations, the wireless communication device 102 comprises an electronic computing device operable to receive, transmit, process and store any appropriate data associated with the communication system 100. As used in this disclosure, the wireless communication device 102 is intended to encompass any electronic device and/or computing device that has wireless communication capability. For example, the wireless communication device 102 may comprise a tablet computer, a personal computer, a laptop computer, touch screen terminal, workstation, network computer, kiosk, wireless data port, wireless or wireline phone, personal data assistant (PDA), smartphone, at least one processor within these or other devices, or any other suitable processing device. For example, the wireless communication device 102 may comprise a wireless communication device that includes an input device, such as a keypad, touch screen, mouse, or other device that can accept information, and an output device that conveys information associated with the operation of the resources, including digital data, visual information, or GUI. Both the input device and output device may include fixed or removable storage media such as a magnetic computer disk, CD-ROM, or other suitable media to both receive input from and provide output to users of terminals 106 through the display, such as a GUI. In addition, the device 102 may also include less or more perimeters 110 as compared with the three illustrated perimeters 110. In some implementations, the wireless communication device 102 may include at least one personal perimeter for out-of-the-box operation. Based on validating the identity of the user 106 for accessing the enterprise account, the user 106 may be authenticated to use services and/or access resources associated with the enterprise perimeter 110. The enterprise server may automatically generate policies on the wireless communication device 102. The wireless communication device 102 may then dynamically create a new perimeter 110 associated with the enterprise account, which is discussed in more detail in regards to FIG. 4.

The perimeter 110 may include password protection, encryption, and other process for controlling access to resources assigned to the perimeter or internal resources. A perimeter 110 may be generated by the device owner 104, a user 106, an administrator 108, or others. In some examples, the perimeter 110a may be a personal perimeter created by default for the user 106a and managed by the user 106a. In some examples, the perimeter 110a may be an enterprise perimeter created by an administrator 108a for an enterprise and may be managed by a remote management server. In some implementations, each personal perimeter 110 may be associated with a personal account, and each enterprise perimeter 110 may be associated with an enterprise account. In addition, a given perimeter 110 may be accessed by the device owner 104, a user 106, an administrator 108, a combination of the foregoing, or others. In some implementations, each perimeter may be associated with a single user 106; while each user 106 may access multiple device perimeters 110. For example, the user 106a may access resources within both the perimeter 110a and the perimeter 110b. The user 106b may have access to resources in only one perimeter 110c. The device owner 105 may have the ability to remove individual perimeters 110 from the wireless communication device 102. In some implementations, the user 106 may set up or log in to an enterprise account via a user interface. As described previously, the enterprise account may be an account that pushes data to the device 102 (e.g., ActiveSync). When the wireless communication device 102 accesses the account, the perimeter 110 may include policies identifying one or more security settings for the enterprise account. These policies may be at least one of maintained or enforced by an enterprise server (not shown) residing in an enterprise network (or corporate network) 104a. While the perimeters 110 are illustrated as including all aforementioned resources such as data 112, network access resource 114, one or more applications 116, one or more configuration files 118, and one or more policies 120, the perimeters 110 may include some, all or different resources without departing from the scope of the disclosure.

In some implementations, the perimeter 110 may include one of one or more of the following states: unlocked (e.g., all operations to files in a file system domain are allowed; soft locked (e.g., all operations to the files in the domain are allowed, but running applications are prohibited, and user interactions are prevented, until the user unlocks; hard locked (e.g., no operations are allowed to access files in the domain, and the underlying encryption domain is locked); or others. When the system boots up, the domain may be hard locked, i.e., no application can access any resources until the user enters a password. When domain unlocking is executed, the user may be prompted for a password. When the user is validated, the underlying file system domain may be unlocked, and the state of the domain may change to unlocked. When the user selects the "lock" option in the user interface, or an idle timeout occurs, the domain may be soft locked. That is, applications that are running can still write/read from the domain, open/create new files and run as usual. However, user interactions may be prevented since the user interface is locked. If the backend (e.g., the enterprise server) sends a "hard lock" command, the underlying file system may be hard locked. The applications may no longer open, read, write or perform any operations on the files in the domain. Specifically, the domain may be hard locked when it is a) out of reboot, or b) if the backend sends a hard lock command. Otherwise, the domain may either be unlocked or soft locked. The underlying file system domain may not be locked unless it has never been unlocked after reboot or the backend has requested for the file system domain to be locked. Once a user enters a password, the underlying file system may be locked. In some implementations, the user can lock or unlock the user interface.

In the illustrated implementation shown in FIG. 1, a given perimeter 110 may include data 112, network access resource 114, applications 116, configuration files 118, a policy 120, a combination of the foregoing, or other resources. The data 112 may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the wireless communication device 102 and its applications 116. Additionally, the data 112 may include any other appropriate data, such as data associated with VPN applications, firmware logs and policies, firewall policies, a security or access log, print or other reporting files, as well as others. The data 112 may be stored in any memory or database module and may take the form of volatile or non-volatile memory including, without limitation, magnetic media, optical media, random access memory (RAM), read-only memory (ROM), removable media, or any other suitable local or remote memory component.

The network access resource 114 may include any parameters, variables, policies, algorithms, instructions, settings, or rules for granting access to the network 102a or 102b or other network. For example, the network access resource 114 may include or identify firewall policies for accessing the enterprise network 104a. In some implementations, the network access resources 114 include or otherwise identify one or more of the following: a username; a password; a security token; a Virtual Private Network (VPN) configuration; firewall policies; a communication protocol; encryption key certificates, or others.

The applications 116 may comprise any application, program, module, process, or other software that may execute, change, delete, generate, or otherwise manage business information according to the present disclosure. In certain cases, the communication system 100 may implement a composite application 135. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the wireless communication device 102, one or more processes associated with the application 116 may be stored, referenced, or executed remotely. For example, a portion of the application 116 may be an interface to a web service that is remotely executed. Moreover, the application 116 may be a child or sub-module of another software module or enterprise application (not illustrated) without departing from the scope of this disclosure. In some implementations, the application 116 may be a hosted solution that allows multiple parties in different portions of the process to perform the respective processing. For example, the enterprise network 102 may access the application 116 on the wireless communication device 102 or even as a hosted application located over network 102b without departing from the scope of this disclosure. In another example, portions of the application 116 may be used by the user 106 working directly at the wireless communication device 102, as well as remotely via enterprise network 102a. In some implementations, the applications 116 may be configured to access at least one of a personal perimeter 110 or an enterprise perimeter 110, which may be referred to as dual mode applications or hybrid mode applications. A dual mode application 116 may access either a personal perimeter 110 or an enterprise perimeter 110. A hybrid mode application 116 may access both a personal perimeter 110 and an enterprise perimeter 110.

The configuration files 118 may include any parameters, variables, policies, algorithms, instructions, settings, or rules for configuring software of the wireless communication device 102. For example, the configurations 118 may include a table that identifies settings for one or more applications 116. In some implementations, the configuration file 118 identifies initial settings for one or more applications 116. In addition to user applications 116, the configuration file 118 may identify settings for other types of applications such as operating system settings. The files 118 are often written in ASCII (rarely UTF-8) and line-oriented, with lines terminated by a newline or carriage return/line feed pair, depending on the operating system.

The policy 120 may include any parameters, variables, policies, algorithms, instructions, settings, or rules for accessing accounts. For example, the policy 120a may identify one or more accounts external in the network 104 and information for accessing the accounts. For example, the policy 120 may include a password, an encryption algorithm and key, and access rules. In some implementations, the policy 120 may include or otherwise identify one or more of the following: a password; an encryption key; access rules; a specific account; a network address; internal resources; a user; an owner; an administrator; a time period; or other information. With regard to external accounts, the policy 120 may identify a specific account and associated rules or information for accessing the external account. In some implementations, a policy 120 may define or otherwise identify a process for user authentication prior to enabling access to an account. For example, the policy 120 may identify the type and content of user authentication (e.g., password strength, lifecycle) to apply to an account-access request.

The wireless communication device 102 may be connected to multiple networks, such as the enterprise network 104a and the public network 104b. The enterprise network 104a is a network associated with an enterprise. The enterprise may comprise a corporate or business entity, a government body, a non-profit institution, or any other organization connected to the wireless communication device 102.

The enterprise may be the owner 104 of the wireless communication device 102. Of course, the enterprise may also lease the wireless communication device 102 or may hire contractors or agents who are responsible for maintaining, configuring, controlling, and/or managing the wireless communication device 102. In the illustrated implementation, the networks 104 facilitate wireless and/or wireline communication with the wireless communication device 102. The networks 104 may communicate, for example, Internet Protocol (IP) packets, Frame Relay frames, Asynchronous Transfer Mode (ATM) cells, voice, video, data, and other suitable information between network addresses. In addition, while the enterprise network 104a and the public network 104b are each illustrated as a single network, each network 102 may comprise a plurality of networks. In short, the enterprise network 104a and the public network 104b are any suitable network that configured to communicate with the device 104.

Figure 2:
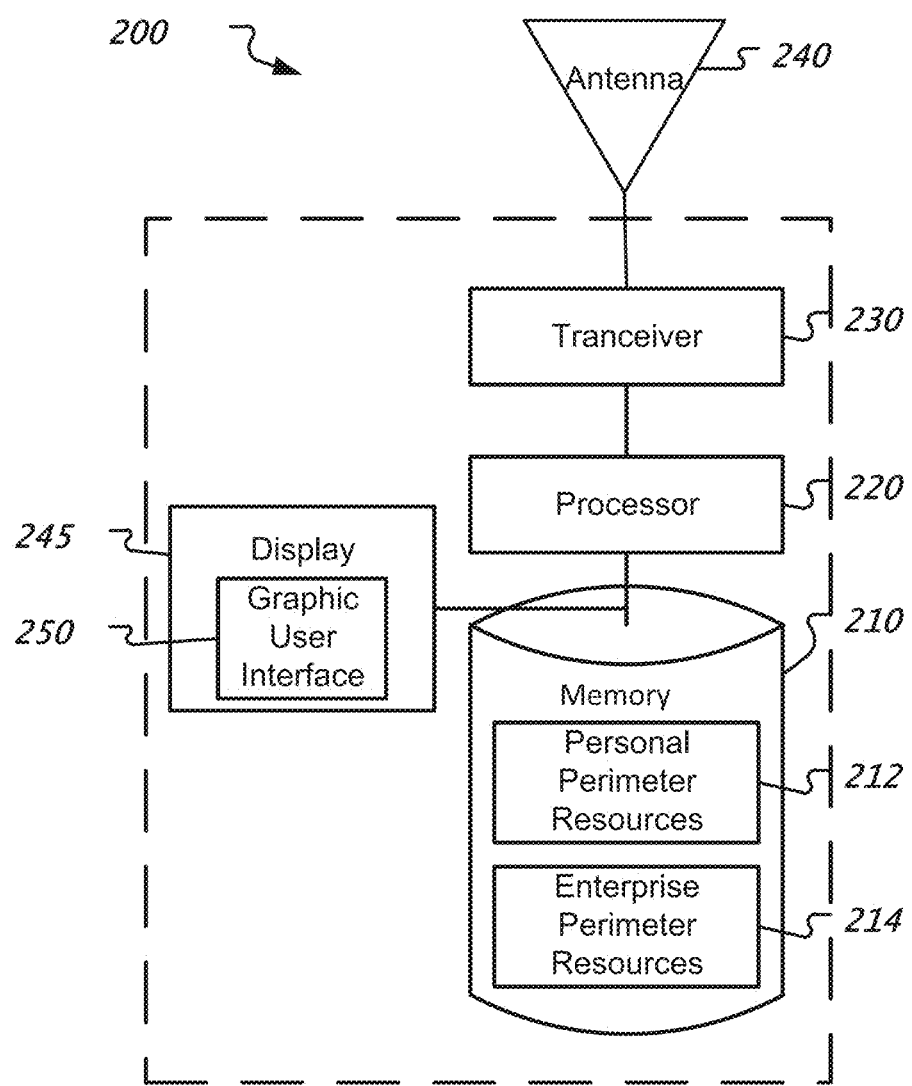
FIG. 2 is an example wireless communication device of FIG. 1.

As previously mentioned, the device 102 may use a bridge to communicate with the cellular network to access the enterprise account. FIG. 2 is an example device 200 for bridging the device 102 to the cellular network. The wireless communication device may include a processor 220, a memory 210, a wireless transceiver 230, an antenna 240, and a GUI 250. The memory 210 may further include personal perimeter resources 212 associated with a personal perimeter, and enterprise perimeter resources 214 associated with a personal perimeter. The personal perimeter resources 212 and the enterprise perimeter resources may be logically separated from each other. It should be understood that the wireless communication device may include additional or different components.

The processor 220 may include a microprocessor, a central processing unit, a graphic control unit, a network processor, or other processors for carrying out instructions stored in the memory 210. The functions of the processor 220 may include computation, queue management, control processing, graphic acceleration, video decoding, and execution of a sequence of stored instructions from the program kept in the memory 210. In some implementations, the processor 220 may also be responsible for signal processing including sampling, quantizing, encoding/decoding, and/or modulation/demodulation of the signal.

The memory 210 may include any memory or database module and may take the form of volatile or non-volatile memory including, without limitation, magnetic media, optical media, random access memory (RAM), read-only memory (ROM), removable media, or any other suitable local or remote memory component. The memory 210 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the wireless communication device and its personal/enterprise applications. In some implementations, such as the implementation shown in FIG. 2, the memory 210 may store the personal perimeter resources 212 and the enterprise perimeter resources 214. The resources included in the personal perimeter and the enterprise perimeter may be logically separated from each other. For example, the enterprise perimeter may enforce password protection, secure or encrypt data of the enterprise perimeter resources 214 stored for the associated enterprise account. As such, access to the enterprise perimeter resources 214 from outside applications (e.g., personal information manager (PIM) application) may be limited.

The wireless transceiver 230 can include both the transmitter circuitry and the receiver circuitry. The wireless transceiver 230 may be responsible for up-converting a baseband signal to a passband signal or vice versa. The components of wireless transceiver 230 may include a digital to analog converter/analog to digital converter, amplifier, frequency filter and oscillator. An antenna 240 generally comprises a transducer which can transmit and/or receive electromagnetic waves. The antenna 240 can convert electromagnetic radiation into electric current, or vice versa. The antenna 240 is generally responsible for the transmission and reception of radio waves, and can serve as the interface between the transceiver 230 and the wireless channel. In some implementations, the wireless communication device may be equipped with multiple antennas to take advantage of the multiple-input-multiple-output (MIMO) technology. The multiple antenna MIMO technology may enable the wireless communication device to set up multiple parallel data streams on the wireless channel, thereby increasing the throughput or reliability of the wireless channel.

The display 245 can be an output unit for presentation of information in visual or tactile form in response to electronic input signals. In some implementations, the display 245 may include a touchscreen, which is an electronic visual display that may detect the presence and location of a touch within the display area. Touchscreen may generally refer to a display that detects a touch with a finger or hand. Touchscreens also may detect other passive objects, such as a stylus. Therefore, a display 245 that includes a touchscreen can also be used as an input unit. In some cases, the wireless communication device may also include a keypad as an input unit.

The GUI 250 may be presented on the display 245. The GUI 250 may be operable to interface with resources included in the personal perimeter and/or the enterprise perimeter. For example, the GUI 250 may generate a visual representation of applications (e.g., a web browser application). The GUI 250 may provide interface for interactions between the wireless communication device and an enterprise service. Generally, through the GUI 250, the user is provided with an efficient and user-friendly presentation of data provided by or communicated within the system. The GUI 250 may be any graphical user interface, including but not limited to, a web browser, touch screen interface, or command line interface (CLI) that processes information and presents the processing results to the user. In general, the GUI 250 may include a plurality of user interface elements, such as interactive fields, pull-down lists, and buttons operable by the user on the wireless communication device. Some example implementations of the GUI in accordance with the present disclosure are described with regard to FIGS. 5A-C.

Figure 3:
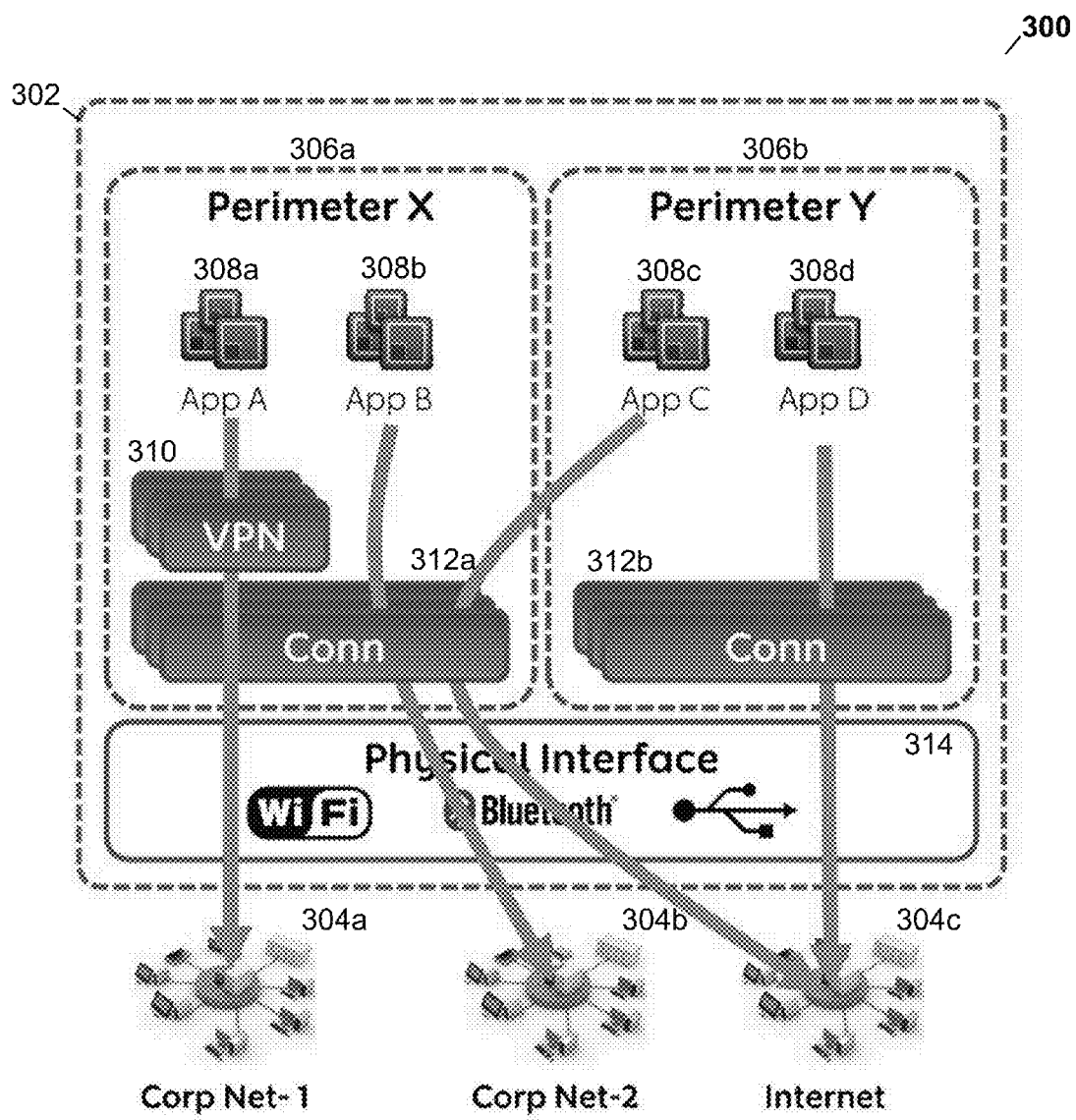
FIG. 3 is a schematic showing data flows in an example wireless system.

FIG. 3 is a schematic showing data flows in an example wireless system 300. In the illustrated implementation, the wireless communication device 302 is configured to communicate with corporate networks 304a and 304b and the Internet 304c. The wireless communication device 302 includes a perimeter 306a and a perimeter 306b. The perimeter 306a includes applications 308a and 308b, and the perimeter 306b includes applications 308c and 308d. The perimeter 306a may include a virtual private network (VPN) 310 that securely connects the application 308a to the enterprise network 304a. In some implementations, setting up a connection via the VPN 310 to the enterprise network 304a may trigger the wireless communication device 302 to automatically create an enterprise perimeter, such as the perimeter 306a.

The perimeter 306a and the perimeter 306b may include the network connection resource 312a and the network connection resource 312b. The application 308b in the perimeter 306a connects to the enterprise network 304b through the connection 312a. In some implementations, the application 308c in the perimeter 306b crosses perimeters to access the resource or network connection resource 312a in the perimeter 306a to connect to the internet 304c. The application 308d in the perimeter 306b connects to the internet 365 using the network connection resource 312b in the perimeter 306b. All the aforementioned network connection resources 312 may be information for physically connecting through a physical interface 314, which may use wireless, Bluetooth, Universal Serial Bus (USB), Radio Frequency Identification (RFID), Near Field Communication (NFC), or other connection technologies. In some implementations, the perimeter 306a may be an enterprise perimeter, and the perimeter 306b may be a personal perimeter.

In some implementations, the perimeter network policy may include information for accessing an application, an application-perimeter, a network, and other resources. For example, the application field may describe the application to which the policy is assigned. The application field may include values that indicate the perimeter may be applied to all applications regardless of author, id, and/or version. The application field may have an Author-ID value that indicates the perimeter may be applied to any application published by the specified author. The application field may have an Application-ID value that indicates the perimeter may be applied to all versions of the specified application. The application field may have an Application-Version-ID value that indicates the perimeter may be applied to a specific version of the application.

In some implementations, the wireless communication device 302 may further include perimeter encryption policy, which may include fields such as the file system path, encryption, etc. The field for file system path may contain values that describe the area of the file system to which the policy applies. The values in the encryption field may describe whether the file system contents should be encrypted or unencrypted.

The applications 308a-d may execute inside the perimeter 306 that each has been assigned to at startup. For example, the applications 308a and 308b can be executed in the perimeter 306a, and the applications 308c and 308d may be executed inside the perimeter 306b. In some implementations, these assignments cannot be changed in flight or after the system startup while the operating system is running. The perimeter 306 may define the environment available to each application, for example, the file directories, network resources, device capabilities, and others. In some implementations, running an application 308 in a corporate perimeter 306 can point the application 308 to a corporate repository. Applications are then installed and managed in the corporate perimeter 306.

An application may be installed into several perimeters 306 simultaneously (e.g., different versions, different licenses, etc.). In these perimeters 306, each perimeter installation may follow its own lifecycle. The perimeter administrator, such as the administrator 108 as shown in FIG. 1, may use a policy to describe which applications may or may not be installed inside the administrated perimeter. When viewing an existing resource (e.g., a media file, an online streaming video, a website, etc.), the view application may be automatically launched in the appropriate perimeter 306.

Figure 4:
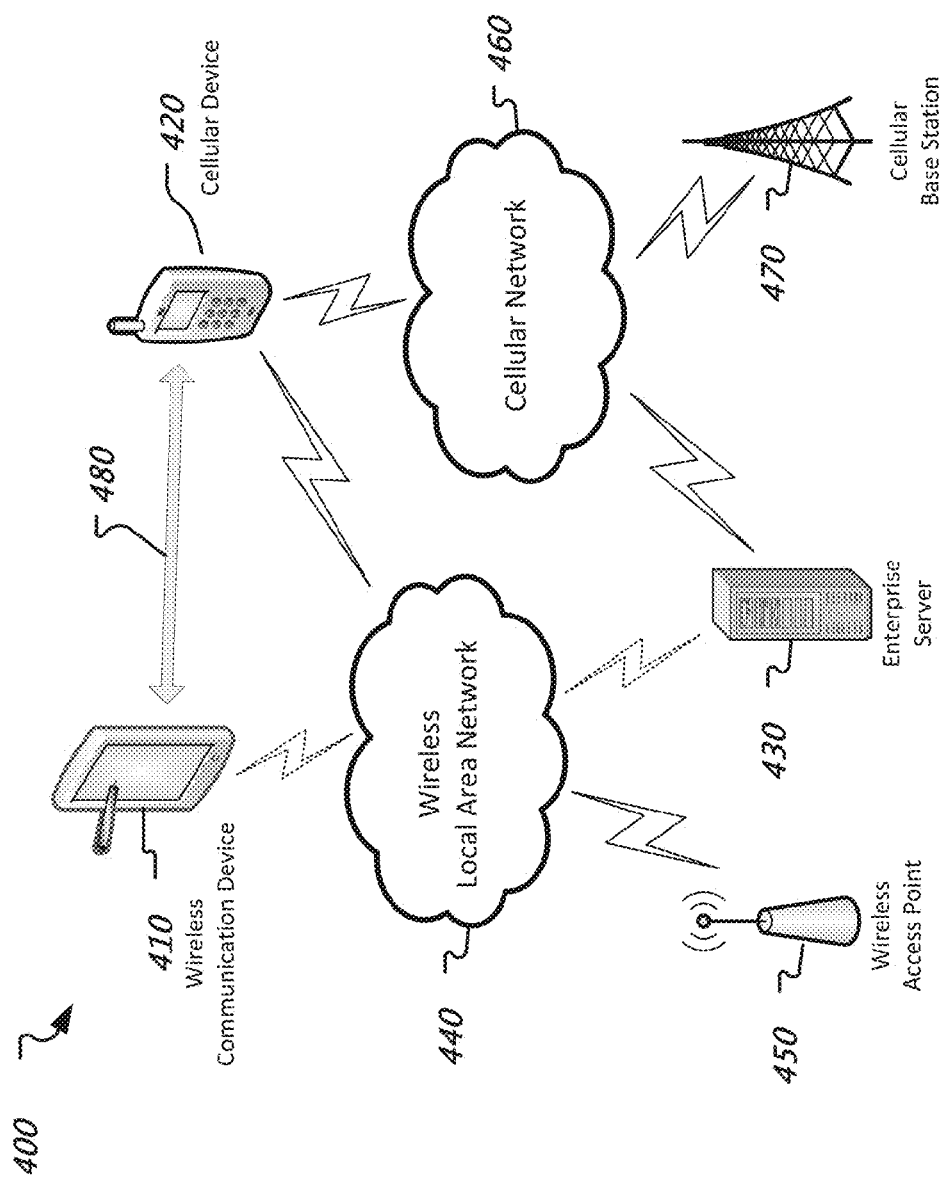
FIG. 4 is another example wireless communication system in accordance with some implementations of the present disclosure.

FIG. 4 is an example wireless communication system 400 in accordance with one or more implementations of the present disclosure. In the illustrated example, the wireless communication system 400 includes a wireless communication device 410, a cellular device 420, an enterprise server 430, a wireless access point 450 and a cellular base station 470. The wireless communication device 410 and the cellular device 420 may wirelessly communicate with a wireless access point 450 using a WLAN 440 with Wi-Fi or WiMAX services. The cellular device 420 may wirelessly communicate with a cellular base station 470 via a cellular network 460 with cellular services. The enterprise server 430 may be in an enterprise network (not shown) and communicably coupled to the WLAN 440 and the cellular network 460. In some implementations, the wireless communication device 410 may communicate with the cellular device 420 through tethering 480. For example, the cellular device 420 may be a bridge device, and information may be communicated between the wireless communication device 410 and the enterprise server 430 through the cellular device 420. In some implementations, the wireless communication device 410 may also have cellular network communication capability. In such cases, the wireless communication device 410 may communicate to the enterprise server 430 and the cellular base station 470 via the cellular network 460. It should be understood that the wireless communication system 400 can include additional or different components without departing from the scope of the disclosure.

The wireless communication device 410 may be any wireless communication device 102 described with regard to FIG. 1. The cellular device 420 may be any wireless communication device that includes cellular network communication capability. The cellular network 460 may be any telecommunication radio networks served by cellular base stations. For example, the cellular network 460 may be a $2^{nd}$ generation (2G), a $3^{rd}$ generation (3G), or a $4^{th}$ generation (4G) telecommunication network. Example 2G, 3G and 4G telecommunication network standards include Global System for Mobile communication (GSM), Interim Standard 95 (IS-95), Universal Mobile Telecommunications System (UMTS), CDMA2000 (Code Division Multiple Access), 3GPP long-term evolution (LTE), LTE-Advanced (LTE-A), and others. The cellular base station 470 may sometimes be referred to as cell site, Node B, evolved Node B based on implementations that can serve one or more cells included in the cellular network 460.

The WLAN 440 may be a network defined in the Institute of Electrical and Electronics Engineers (IEEE) wireless communications standards, e.g., IEEE 802.11a, IEEE 802.11b, IEEE 802.11g, IEEE 802.11n, or IEEE 802.11ac. The WLAN 440 may be used to provide Wi-Fi and/or WiMAX wireless services. The wireless access point 440 is an electronic device that may allow wireless communication devices to connect to a wired network using WLAN related standards. In some implementations, wireless access point 440 may be connected to a router (via a wired network), and may relay data between the wireless and/or wired devices on the WLAN based on tethering 480.

In some implementations, the wireless communication device 410 (e.g., a BlackBerry Playbook tablet PC) and the enterprise server 430 may directly communicate with each other via the WLAN 440, and/or the cellular network 460. The wireless communication device 410 may include a default perimeter. The default perimeter may be a personal perimeter that includes resources such as the resources described with regard to FIG. 1. The resources included in the personal perimeter may allow the wireless communication device 410 to perform "out of the box" operations. As discussed with regard to FIG. 1, the wireless communication device may dynamically generate an enterprise perimeter based on one or more trigger events. For example, a user of the wireless communication device 410 may add an enterprise account (e.g., a server resource account) to the wireless communication device 410, and this process may be a trigger event for generating the enterprise perimeter. An example process of adding an enterprise account that triggers the generation of enterprise perimeter is described with regard to FIG. 5.

The enterprise account may be, for example, an ActiveSync email/calendar/contacts account. The enterprise account may be associated with an enterprise perimeter such that the perimeter may secure applications, data, and security policies for accessing the account. The enterprise server 430 may maintain or enforce resources, settings, and security policies associated with the enterprise perimeter. The wireless communication device may detect a trigger event based on a setting/policy (e.g., a device password protection policy) associated with the enterprise account. The setting/policy may be detected by the wireless communication device 410 as a pattern or a parameter. In some implementations, when the setting/policy is detected, the wireless communication device 410 may automatically/dynamically generate a new enterprise perimeter to securely separate resources associated with the enterprise account, and provide access privileges for the enterprise account to the wireless communication device 410. Automatically generating the new enterprise perimeter may further include retrieving security policies associated with the enterprise perimeter from the enterprise server 430. The new enterprise perimeter may be a private "enterprise" perimeter that can allow the wireless communication device 410 to download and locally access the resources included in the enterprise perimeter. In some other implementations, when the setting/policy is detected, a graphic user interface prompt may be presented using the wireless communication device 410. The user of the wireless communication device 410 may generate the new enterprise perimeter enter a request to generate the new perimeter.

In some implementations, the wireless communication device 410 may access the enterprise server 430 based on tethering via the cellular device 420. For example, when the wireless communication 410 does not have cellular network access functionality, and the enterprise server is not communicably coupled to the WLAN 440, the wireless communication device 410 may not be able to communicate directly with the enterprise server 430. In such case, if the cellular device 420 (e.g., a BlackBerry smart phone) includes tethering functionality and can perform cellular network communications with the enterprise server 430, the cellular device 420 may then be used as a bridge device (or a relay) to enable communication between the wireless communication device 410 and the enterprise server 430. The wireless communication device 410 and the cellular device 420 may be tethered using Bluetooth connection, data cable, or other personal or local area networks. The cellular device 420 may have access to an enterprise account maintained on the enterprise server 430. The cellular device 420 may also have an enterprise perimeter associated with the enterprise account generated locally on the cellular device 420. When tethering, a user may add the enterprise account on the wireless communication device 420. A trigger event may be detected by the wireless communication device 410 for generating the enterprise perimeter, based on a setting/policy associated with the enterprise perimeter stored on the cellular device 420. The wireless communication device 410 may then retrieve settings/policies associated with the enterprise perimeter on the cellular device 420, and automatically generate a new enterprise perimeter based on the retrieved settings/policies.

The event that triggers the creation of a perimeter may result from various applications. Setting up an ActiveSync account or connecting to a bridge device may be two examples. Generally, the trigger events may be associated with password protection policies. In Some cases, the passwords are stored in a password manager. The creation of a new record in the password manager may generate an event that triggers the creation of a new perimeter. Applications that use the password manager can use the service to create, allow or deny access to perimeters. For example, adding a new ActiveSync account may add a new record to the password manager that can trigger the creation of a new perimeter. Connecting to a new bridge device may also create a new password record in the password manager, and correspondingly, a new perimeter on a wireless communication device. A VPN connection may be another password-associated service provided to a wireless communication device that can create a perimeter or allow/deny access to a perimeter.

Figure 5A:
FIG. 5A-C are example displays illustrating an example process for creating an enterprise perimeter.

FIG. 5A is an example screen 510 for creating an enterprise perimeter based on using a GUI. The GUI may be presented on a touchscreen display 245 of a wireless communication device (e.g., a BlackBerry Playbook tablet PC), as described with regard to FIG. 2. As shown in the first screen 510 of the example GUI, the left hand side of the GUI displays content includes in a personal perimeter 540*a*. The personal perimeter 540*a* may be a default perimeter of the wireless communication device, as described with regard to FIG. 4. Since the personal perimeter 540*a* may be a default perimeter, a user of the wireless communication device may have the permission to access and manipulate the documents under the personal perimeter 540*a*. The right hand side of the GUI displays an enterprise perimeter (or a corporate perimeter) 550*a*. In 510, the user has not logged in to its enterprise account. Thus, the corporate screen associated with the enterprise perimeter 550*a* is locked. The user may slide or click the scroll bar 560 to trigger a password authentication process.

Figure 5B:

FIG. 5B is a second screen 520 of the example GUI. In these implementations, the screen 520 shows a pop-up window 570 prompting to receive the password to log in to the enterprise account. The account settings may accordingly be added to the wireless communication device. As described with regard to FIG. 4, log in to the enterprise account or adding the enterprise account to the wireless communication device may create a new record at the password manager on an enterprise server, which may trigger an event for the enterprise server to "push down" settings/policies to the wireless communication device. Upon detecting a pattern/parameter associated with the settings/policies, the wireless communication device may automatically generate the enterprise perimeter associated with the newly added enterprise account.

Figure 5C:
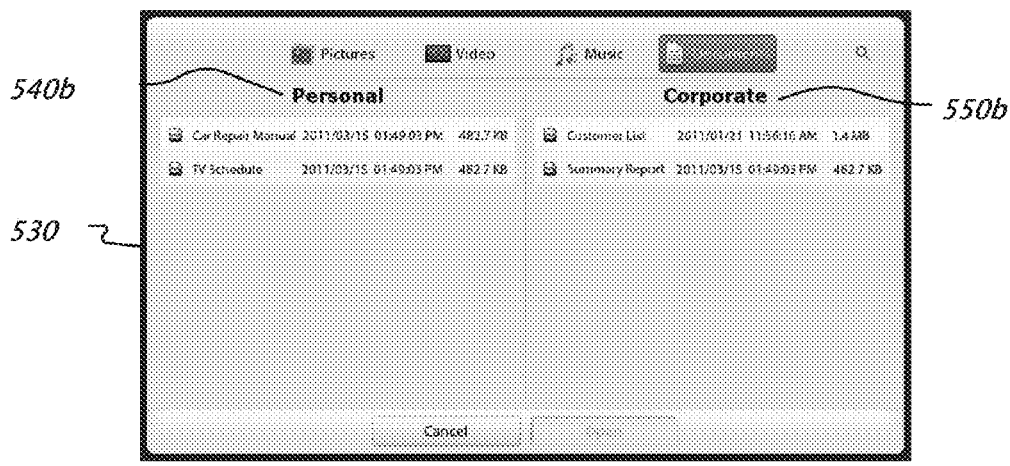

FIG. 5C is a third screen 530 of the example GUI. In these implementations, the screen 530 illustrates both the personal perimeter 540*b* and the enterprise perimeter 550*b*. The documents included in the personal perimeter 540*b* and the enterprise perimeter 550*b* are logically separated from each other and stored in the wireless communication device. The user may not be permitted to transfer documents between the personal perimeter 540b and the enterprise perimeter 550b. As such, the corporate data included in the enterprise perimeter 550b may be secured.

Figure 6:
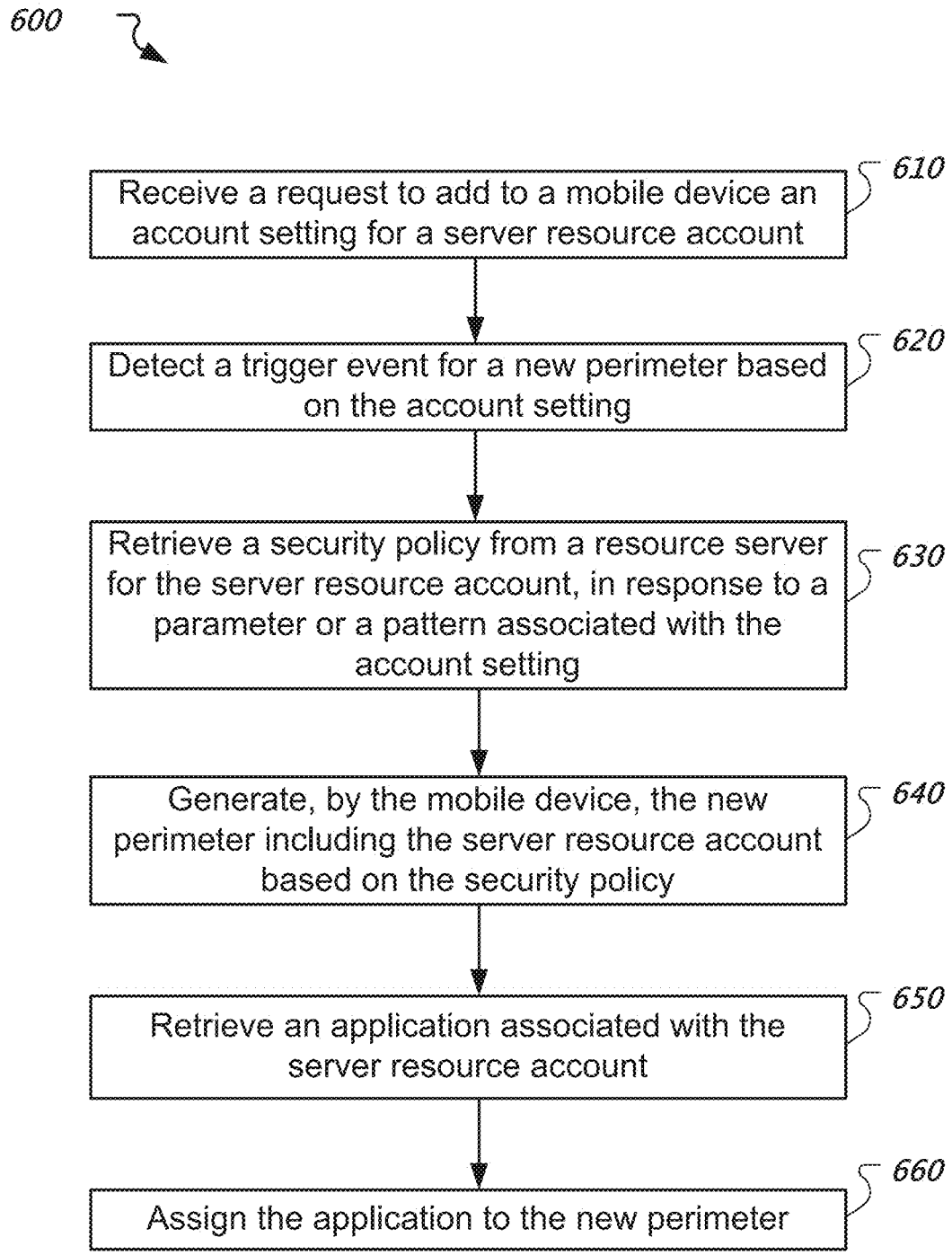
FIG. 6 is a flowchart showing an example process for dynamically generating a perimeter.

FIG. 6 is a flowchart showing an example process 600 of dynamically generating a perimeter. The example process 600 may be performed by a mobile device. The mobile device may be any wireless communication device described with regard to FIG. 1. At 610, the mobile device receives a request to add to the mobile device an account setting for a server resource account. The server resource account may be an enterprise account as described with regard to FIG. 1. The mobile device may receive the request from a user interacting with the mobile device. For example, the mobile device may detect the request based on, for example, sliding the scroll bar 560, which enables the enterprise login, and verifying the entered password. The request may also be received based on other server resource account accessing events.

At 620, the mobile device detects a trigger event for a new perimeter based on the account setting. A few examples of possible trigger events are described with regard to FIG. 4. The trigger event may include at least one of setting up an account that provides push synchronization or connecting to a bridge device. At 630, in response to a parameter or a pattern associated with the account setting, the mobile device receives a security policy from a resource server for the server resource account. The resource server may be an enterprise server described with regard to FIG. 4. At 640, the mobile device generates a new perimeter including the server resource account based on the security policy. The new perimeter is configured to prevent transferring data associated with the server resource account being transferred to mobile device resources external to the new perimeter. The new perimeter may be automatically/dynamically generated by the mobile device based on retrieving the security policy, instead of using an enrollment process, in which the perimeter may be generated by an administration from the resource server side.

At 650, the mobile device retrieves an application associated with the server resource account. The application may be retrieved from the resource server. At 660, the mobile device assigns the application to the new perimeter. The new perimeter is configured to prevent resources of the mobile device external to the new perimeter from accessing the application. In other words, the application is associated with the new perimeter, and may be accessed by resources included in the new perimeter. The application may not be accessed by resources outside of the new perimeter.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method, comprising: receiving a request to add to a mobile device an enterprise application for accessing an enterprise account;
   in response to detection of a parameter or a pattern associated with an account setting, retrieving a security policy from a resource server for the enterprise account; in response to the request to add the enterprise application and the detection of the parameter or the pattern associated with the account setting, generating, by the mobile device, a new logical separation of resources associated with the enterprise application and other enterprise resources on the mobile device, wherein the new logical separation of resources prevents applications on the mobile device external to the new logical separation of resources from accessing resources associated with the new logical separation of resources;
   receiving, from the resource server, a client certificate for establishing a secure channel with an enterprise;
   assigning the client certificate to the new logical separation of resources; when the new logical separation of resources is unlocked, granting access between the other enterprise resources and the enterprise application and granting the external resources on the mobile device to access the enterprise application and the other enterprise resources on the mobile device, wherein an unlock state allows applications to access files in a file system domain;
   when the new logical separation of resources is soft locked, granting access and operations between the other enterprise resources and the enterprise application while preventing user interactions with the enterprise application the external resources on the mobile device from accessing the enterprise application and the other enterprise resources on the mobile device, wherein the soft locked state allows applications running on the mobile device to access the files in the file system domain and locks an user interface on the mobile device; and
   when the new logical separation of resources is hard locked, preventing access between the other enterprise resources and the enterprise application while preventing the external resources on the mobile device from accessing the enterprise application and the other enterprise resources on the mobile device, wherein a hard lock state prohibits applications from accessing the files in the file system domain and locks an underlying encryption domain.

2. The method of claim 1, wherein the enterprise account comprises at least one of an email account, a calendar account, or a contacts account.

3. The method of claim 1, wherein generating the new logical separation of resources comprises automatically generating the new logical separation of resources independent of an administrator of the resource server setting policies or configuring of the new logical separation of resources.

4. The method of claim 1, wherein the pattern or parameter includes at least one of an account address, a network address, a policy, one or more settings associated with adding access to a new account that provides push synchronization, or one or more settings associated with connecting to a bridge device.

5. The method of claim 1, wherein the security policy includes at least one of password protection or data encryption.

6. The method of claim 1, wherein the account setting includes login information.

7. The method of claim 1, wherein the account setting includes an email address.

8. The method of claim 1, wherein the server resource account includes an enterprise account.

9. The method of claim 8, wherein the enterprise account includes an enterprise email account.

10. The method of claim 1, wherein the new logical separation of resources includes a logical separation of resources for enterprise or a logical separation of resources for corporate.

11. A mobile device, comprising: one or more processors operable to:
receive a request to add to a mobile device an enterprise application for accessing an enterprise account;
in response to detection of a parameter or a pattern associated with an account setting, retrieve a security policy from a resource server for the enterprise account; in response to the request to add the enterprise application and the detection of the parameter or the pattern associated with the account setting, generate, by the mobile device, a new logical separation of resources associated with the enterprise application and other enterprise resources on the mobile device, wherein the new logical separation of resources prevents applications on the mobile device external to the new logical separation of resources from accessing resources associated with the new logical separation of resources including the enterprise application;
receive, from the resource server, a client certificate for establishing a secure channel with an enterprise;
assign the client certificate to the new logical separation of resources; when the new logical separation of resources is unlocked, grant access between the other enterprise resources and the enterprise application and grant the external resources on the mobile device to access the enterprise application and the other enterprise resources on the mobile device, wherein an unlock state allows applications to access files in a file system domain;
when the new logical separation of resources is soft locked, grant access between the other enterprise resources and the enterprise application and prevent user interactions with the enterprise application, wherein the soft locked state allows applications running on the mobile device to access the files in the file system domain and locks an user interface on the mobile device; and
when the new logical separation of resources is hard locked, prevent access between the other enterprise resources and the enterprise application and prevent the external resources on the mobile device from accessing the enterprise application and the other enterprise resources on the mobile device, wherein a hard lock state prohibits applications from accessing the files in the file system domain and locks an underlying encryption domain.

12. The mobile device of claim 11, wherein the enterprise account comprises at least one of an email account, a calendar account, or a contacts account.

13. The mobile device of claim 11, wherein the one or more processors operable to generate the new logical separation of resources comprises the one or more processors operable to automatically generate the new logical separation of resources independent of an administrator of the resource server setting policies or configuring the new logical separation of resources.

14. The mobile device of claim 11, wherein the pattern or parameter includes at least one of an account address, a network address, a policy, one or more settings associated with adding access to a new account that provides push synchronization, or one or more settings associated with connecting to a bridge device.

15. The mobile device of claim 11, wherein the security policy includes at least one of password protection or data encryption.

16. A computer program product encoded on a non-transitory storage medium, the product comprising computer readable instructions for causing one or more processors to perform operations comprising:
receiving a request to add to a mobile device an enterprise application for accessing an enterprise account;
in response to detection of a parameter or a pattern associated with an account setting, retrieving a security policy from a resource server for the enterprise account; in response to the request to add the enterprise application and the detection of the parameter or the pattern associated with the account setting, generating, by the mobile device, a new logical separation of resources associated with the enterprise application and other enterprise resources on the mobile device, wherein the new logical separation of resources prevents applications on the mobile device external to the new logical separation of resources from accessing resources associated with the new logical separation of resources;
receiving, from the resource server, a client certificate for establishing a secure channel with an enterprise;
assigning the client certificate to the new Ironical separation of resources; when the new logical separation of resources is unlocked, granting access between the other enterprise resources and the enterprise application and granting the external resources on the mobile device to access the enterprise application and the other enterprise resources on the mobile device, wherein an unlock state allows applications to access files in a file system domain;
when the new logical separation of resources is soft locked, granting access and operations between the other enterprise resources and the enterprise application while preventing user interactions with the enterprise application the external resources on the mobile device from accessing the enterprise application and the other enterprise resources on the mobile device, wherein the soft locked state allows applications running on the mobile device to access the files in the file system domain and locks an user interface on the mobile device; and when the new logical separation of resources is hard locked, preventing access between the other enterprise resources and the enterprise application while preventing the external resources on the mobile device from accessing the enterprise application and the other enterprise resources on the mobile device, wherein a hard lock state prohibits applications from accessing the files in the file system domain and locks an underlying encryption domain.

17. The computer program product of claim 16, wherein the enterprise account comprises at least one of an email account, a calendar account, or a contacts account.

18. The computer program product of claim 16, wherein the instructions for causing one or more processors to perform operations comprising generating the new logical separation of resources comprises the instructions for causing one or more processors to perform operations comprising automatically generating the new logical separation of resources independent of an administrator of the resource server setting policies or configuring the new logical separation of resources.

19. The computer program product of claim 16, wherein the pattern or parameter includes at least one of an account address, a network address, a policy, one or more settings associated with adding access to a new account that provides push synchronization, or one or more settings associated with connecting to a bridge device.

20. The computer program product of claim 16, wherein the security policy includes at least one of password protection or data encryption.

21. A system, comprising:
a first mobile device configured to connect a second mobile device to a network through the first mobile device; and
a second mobile device configured to receive a request to add to a mobile device an-enterprise application for accessing an enterprise account, retrieve a security policy from a resource server for the enterprise account in response to detection of a parameter or a pattern associated with an account setting, generate a new logical separation of resources associated with the enterprise application and other enterprise resources on the mobile device in response to the request to add the enterprise application and the detection of the parameter or the pattern associated with the account setting, wherein the new logical separation of resources prevents applications on the mobile device external to the new logical separation of resources from accessing resources associated with the new logical separation of resources including the enterprise application, receive a client certificate from the resource server for establishing a secure channel with an enterprise, assign the client certificate to the new logical separation of resources, when the new logical separation of resources is unlocked, granting access between the other enterprise resources and the enterprise application and granting the external resources on the mobile device to access the enterprise application and the other enterprise resources on the mobile device, wherein an unlock state allows applications to access files in a file system domain, when the new logical separation of resources is soft locked, granting access between the other enterprise resources and the enterprise application while preventing user interactions with the enterprise application, wherein the soft locked state allows applications running on the mobile device to access the files in the file system domain and locks an user interface on the mobile device, when the new logical separation of resources is hard locked, the new logical separation of resources is configured to prevent access between the other enterprise resources and the enterprise application while preventing the external resources on the mobile device from accessing the enterprise application and the other enterprise resources on the mobile device, wherein a hard lock state prohibits applications from accessing the files in the file system domain and locks an underlying encryption domain.

22. The system of claim 21, wherein the enterprise account comprises at least one of an email account, a calendar account, or a contacts account.

23. The system of claim 21, wherein the second mobile device configured to generate the new logical separation of resources comprises the second mobile device configured to automatically generate the new logical separation of resources independent of an administrator of the resource server setting policies or configuring the new logical separation of resources.

24. The system of claim 21, wherein the pattern or parameter includes at least one of an account address, a network address, a policy, one or more settings associated with adding access to a new account that provides push synchronization, or one or more settings associated with connecting to a bridge device.

25. The system of claim 21, wherein the security policy includes at least one of password protection or data encryption.

* * * * *